(12) United States Patent
Mizrahi et al.

(10) Patent No.: US 7,237,548 B2
(45) Date of Patent: Jul. 3, 2007

(54) PORTABLE CHARCOAL GRILL

(76) Inventors: Sadi Mizrahi, 11/11 Harav Neria St., Rishon Lezion, 75751 (IL); Igor Tonkonogi, 5/11 Keren Hayesod St., Rishon Lezion, 75287 (IL); Mark Vasilevsky, 14/4 Av St., Ashkelon, 78728 (IL)

( * ) Notice: Subject to any disclaimer, the term of this patent is extended or adjusted under 35 U.S.C. 154(b) by 154 days.

(21) Appl. No.: 11/082,057

(22) Filed: Mar. 17, 2005

(65) Prior Publication Data
US 2006/0144383 A1 Jul. 6, 2006

(51) Int. Cl.
*F24C 1/16* (2006.01)
(52) U.S. Cl. .................................. 126/9 R; 126/25 R
(58) Field of Classification Search ............... 126/9 R, 126/2, 9 B, 25 R, 25 B, 220
See application file for complete search history.

(56) References Cited
U.S. PATENT DOCUMENTS

| | | | | |
|---|---|---|---|---|
| 2,477,529 A | * | 7/1949 | Sprinkle et al. ............ 126/9 R |
| 4,133,335 A | * | 1/1979 | Malafouris .................. 126/9 R |
| 4,158,992 A | * | 6/1979 | Malafouris ............. 99/421 HV |
| 4,878,476 A | * | 11/1989 | Oliphant ..................... 126/9 R |
| 4,884,499 A | * | 12/1989 | Rensch et al. ................ 99/449 |
| 5,947,007 A | * | 9/1999 | O'Grady ...................... 99/340 |
| 6,009,867 A | * | 1/2000 | Walton ..................... 126/25 B |
| 6,631,711 B2 | * | 10/2003 | Patience .................. 126/25 B |

* cited by examiner

*Primary Examiner*—Kenneth Rinehart
*Assistant Examiner*—Chuka C Ndubizu
(74) *Attorney, Agent, or Firm*—Martin Fleit; Paul D. Bianco; Fleit Kain Gibbons Gutman Bongini & Biancp P.L.

(57) ABSTRACT

Some embodiments of the present invention relate to a portable charcoal grill where, in the closed position, charcoal may be supplied through an opened chimney lid located at the top of the grill, and lit paper or other kindling material may be inserted through an opening to an ignition area located at the bottom of the grill in order to ignite the charcoal. The chimney effect created by the shape and directionality of the closed portable grill may aid in heating and igniting the charcoal. Once the charcoal is at the proper burning point, the portable grill may be safely opened up and a large grilling area may be available for cooking. The legs, which can be used as carrying handles for the grill, may be secured in place by a unique joint that has two or more distinct positions.

13 Claims, 21 Drawing Sheets

PORTABLE CHARCOAL GRILL

FIELD OF INVENTION

This invention relates generally to charcoal grills, and specifically to such devices that are also portable.

BACKGROUND OF THE INVENTION

There are many options for consumers looking for portable charcoal grills. The prior art described below represents some of what is available.

PRIOR ART

U.S. Pat. No. 4,503,835 presents a collapsible or folding element that provides support for the coals, and uses a "chimney effect" for efficiently heating the coals. However, this element is not designed to provide a surface for barbecuing after the coals are heated, therefore the user must provide an additional plate to collect the hot coals, and the action of releasing the hot coals may create a burn hazard.

U.S. Pat. No. 2004035407 offers a portable grill with a folding mechanism for ease of carrying and storage but requires fuel for ignition, and the grilling surface area equals only one of its sides. There is also a very unsafe situation during the turning phase, in that the coals can escape from the opening. Furthermore, if the paper burns out, this grill requires the user to dump out all of the contents and start again, which is inconvenient and potentially unsafe.

CA Patent 1306153 is directed towards a portable grill that offers rapid ignition but is limited to a substantially small number of reuses in the order of ten times or so.

The device described in U.S. Pat. No. 4,133,335 is structured in a way to open up into two halves, each of which can then support a flat, wire, grilling tool, and which uses an open-bed type method of igniting the coals, but this ignition method is time consuming. Furthermore, the mechanism that connects the legs to the body is relatively complicated.

U.S. Pat. No. 2004194774 provides a portable grill with grilling surface area that is larger than the product's closed dimensions but is still quite small. Furthermore, this grill uses only combustible fuel, not paper or charcoal.

Therefore, what is needed is a lightweight, portable, and economical solution to grilling needs that allows for rapid ignition of the coals, incorporates a large grilling area, and is safe, simple, and uncomplicated to operate. It would be additionally useful if such a grill incorporated the added feature of using organic material such as paper for ignition, rather than relying on additional accelerants.

SUMMARY OF INVENTION

Some embodiments of the present invention relate to an all-in-one portable grill, with the added advantage of providing a large built-in surface for grilling that does not require lighter fluids or other accelerants to ignite the charcoals, and offers rapid ignition of the charcoal, by using the chimney effect and paper ignition.

Some embodiments of the present invention described herein relate to a portable grill that has a number of innovative features. The grill may include novel joints that may allow the legs of the grill to rotate with substantial ease from a fully closed position to a securely opened position. The chimney shape created by the grill when in the closed, vertical position greatly reduces the time required to heat the charcoal. By maintaining separate charcoal and ignition areas, additional material may be easily inserted into the ignition area with no need to rearrange burning charcoal. A vented safety cover prevents charcoal from escaping when the grill is rotated, and also acts as an aerating interface that contributes to igniting the coals quickly. Once the charcoal is ignited and the grill is opened, the internal surfaces of both halves of the grill can be used for grilling.

In accordance with some embodiments of the present invention, when the grill is in the closed position, charcoal can be supplied through the opened safety cover located at the top of the portable grill. Lit paper or other organic combustible material may be inserted through a relatively large opening in the grill body into an ignition area located at the bottom of the portable grill in order to ignite the charcoal. The chimney effect created by the shape of the closed portable grill, and by its vertical positioning, aids in heating and firing up the charcoal by channeling the heat into an upwardly directional channel. Once the charcoal is at the proper burning point, the portable grill may be safely opened up and a large grilling area is available for cooking.

BRIEF DESCRIPTION OF DRAWINGS

These and further features and advantages of the invention will become more clearly understood in light of the ensuing description of a preferred embodiment thereof, given by way of example only, with reference to the accompanying drawings, wherein—

DESCRIPTION OF THE PREFERRED EMBODIMENTS

Figure 1:
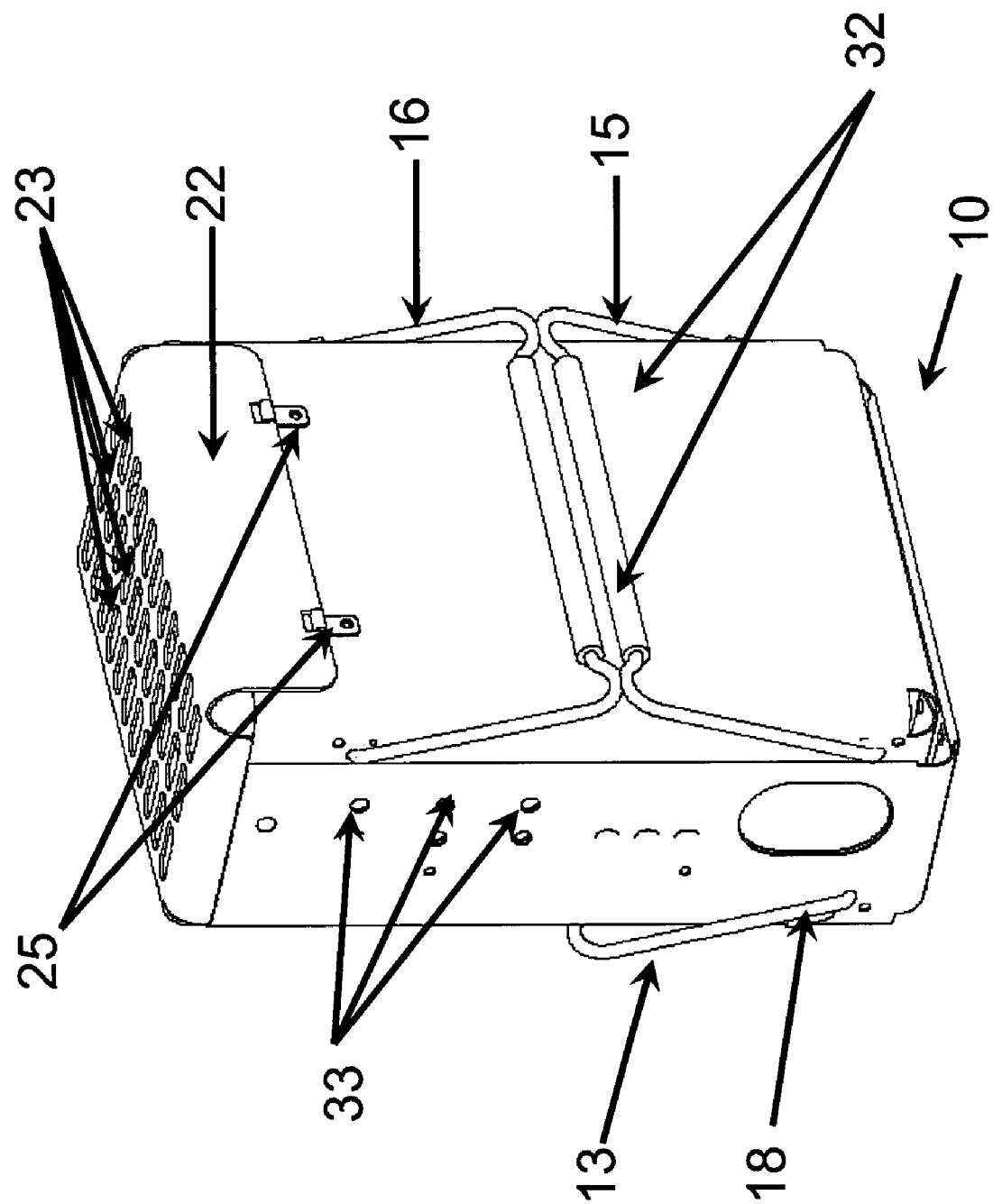
FIG. 1: is a perspective view of a grill in the closed position for transport, in accordance with some embodiments of the present invention.

The description presented here relates to some of the preferred embodiments of the present invention. As illustrated in the embodiments of the present invention shown in FIGS. 1, 3 and 7, the housing of the portable grill (10) may include an outer cover (12) and an inner cover (14), hinged together at one end. In the closed position, the lower end and the lateral sides of the outer cover (12) may overlap and cover the corresponding end and sides of the inner cover (14). When the housing of the portable grill (10) is in the closed, upright position, shown in FIG. 1, it creates a chimney-like space, which may cause the charcoal (29) to heat more quickly and efficiently by channeling the heat into an upwardly directional channel. In the fully opened position, described in FIGS. 8A and 8B, the outer and inner covers (12, 14) provide a large grilling area (37) in which hot charcoal (29) can sit, and over which cooking grids (38) may be placed.

In accordance with some embodiments of the present invention, a vented safety cover (22) may be attached to the hinged end of the inner cover (14) by one or more suitable hinges (25). When the housing is in the closed, vertical position, as shown in FIG. 1, the closed safety cover (22) may further enhance the heating ability of the chimney area. Scattered across the surface of the safety cover (22) are a series of openings (23) that may provide aeration for the flames.

Figure 6A:
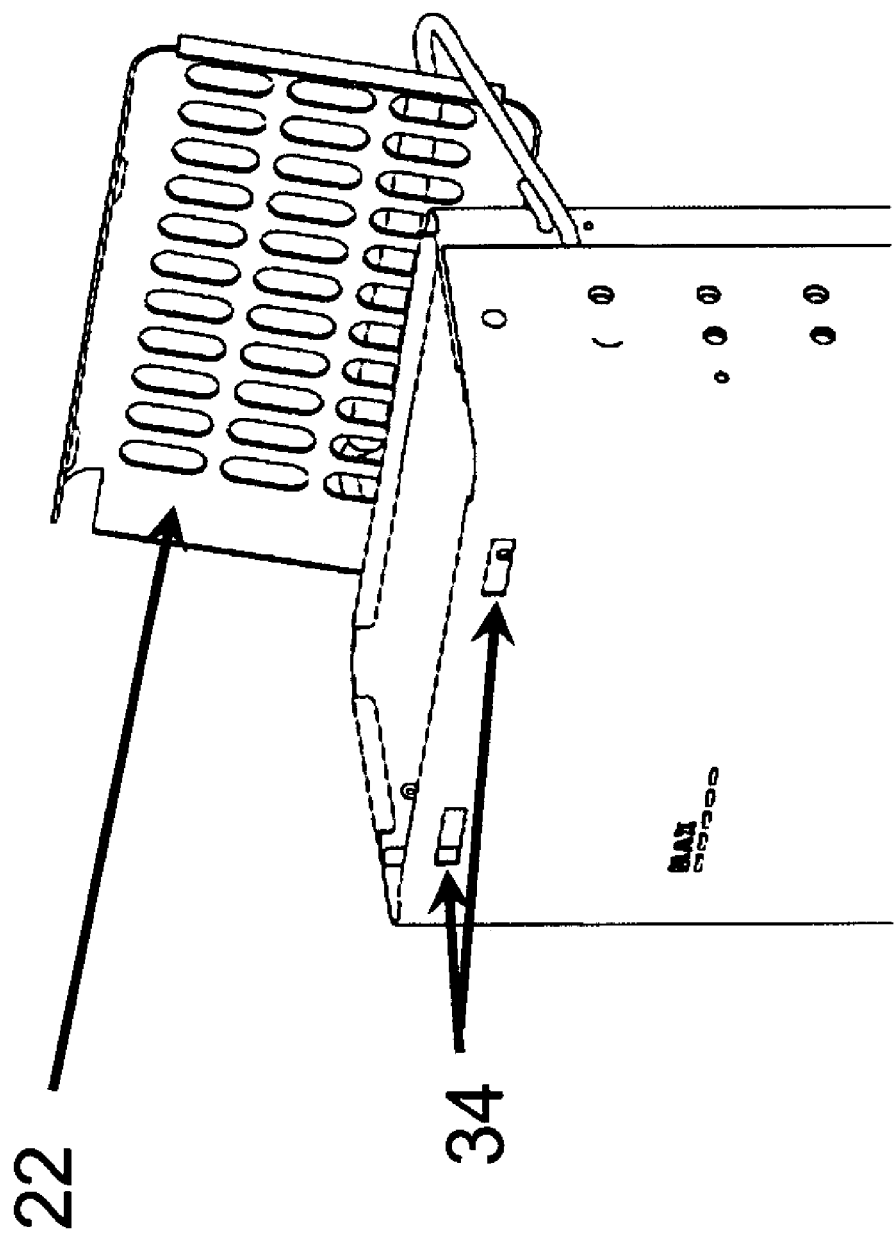
FIG. 6A: shows a perspective view of two vented safety covers, in accordance with some embodiments of the present invention.
Figure 6B:
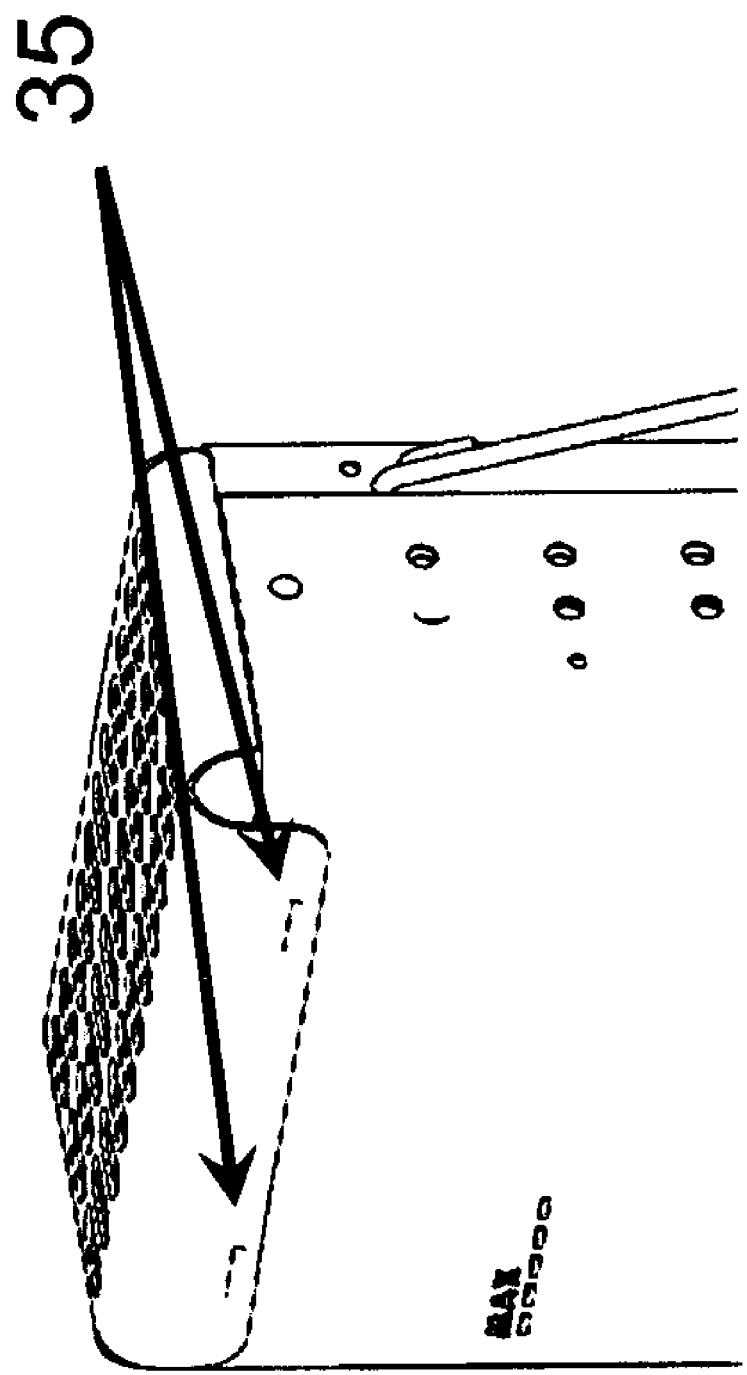
FIG. 6B: shows a perspective view of two vented safety covers, in accordance with some embodiments of the present invention.

In accordance with further embodiments of the present invention, the safety cover (22) may be equipped with a securing mechanism, as shown in FIGS. 6A and 6B. The securing mechanism may hold the safety cover (22) closed in order to prevent charcoal (29) from escaping when the portable grill (10) is repositioned from the vertical to the horizontal position. In the one embodiment of the present invention, a louver (35) and lock (34) type system may be used.

In accordance with yet further embodiments of the present invention, although the safety cover (22) may be secured when the portable grill (10) is in the closed position, upon opening the portable grill (10), the increasingly obtuse angle of the outer and inner covers (12, 14) may create enough mechanical pressure on the louvers (35) to force them out of the locks (34), causing the safety cover (22) to automatically open. This action can be seen in FIGS. 7 and 9. Other securing mechanisms that provide the same properties can also be employed as part of some embodiments of the present invention. The safety cover (22) may be positioned on the outer surface of the portable grill (10) to prevent charcoal (29) from leaking out when the portable grill (10) is being opened.

Figure 6C:
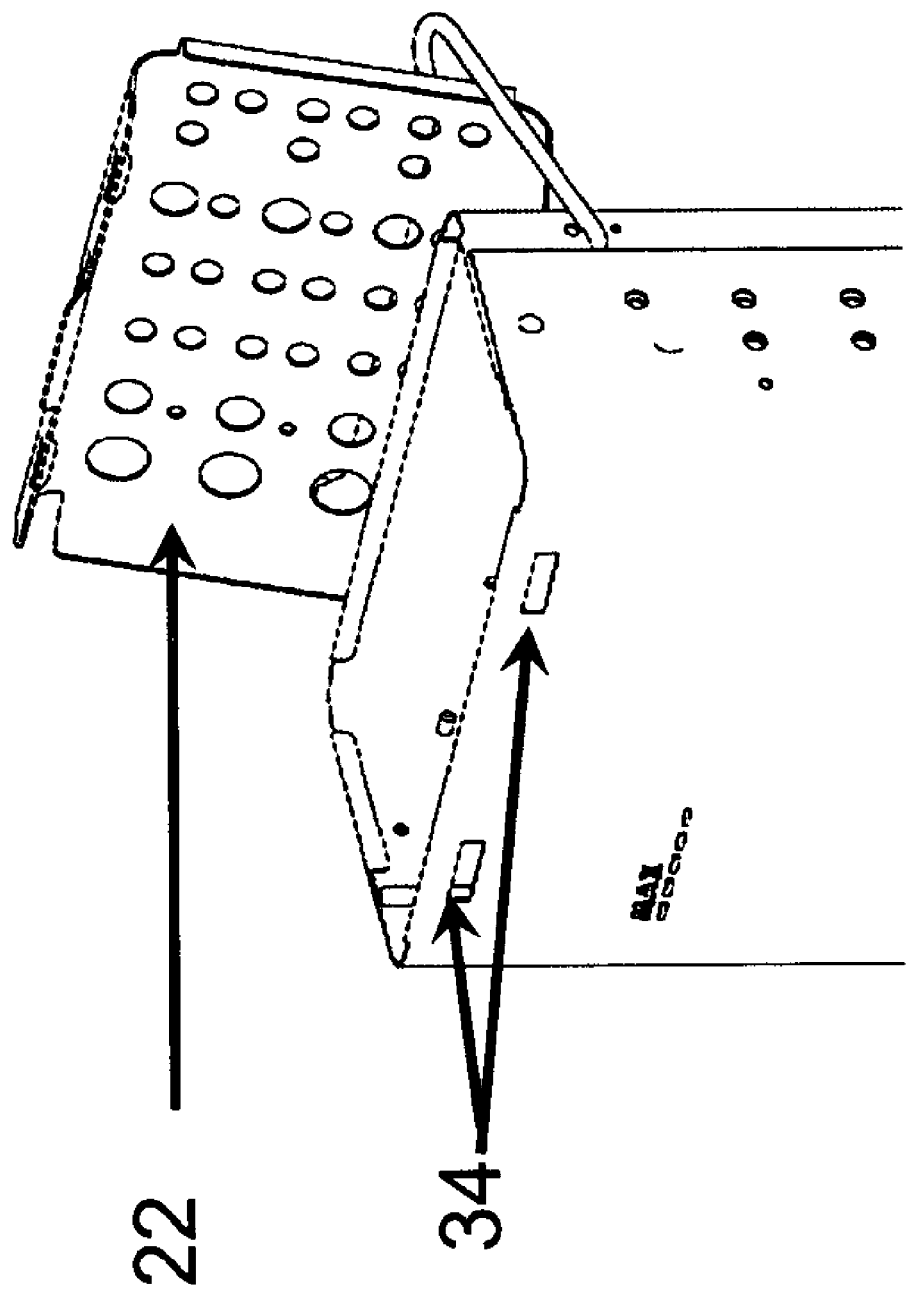
FIG. 6C: shows a perspective view of two vented safety covers, in accordance with some embodiments of the present invention.
Figure 6D:
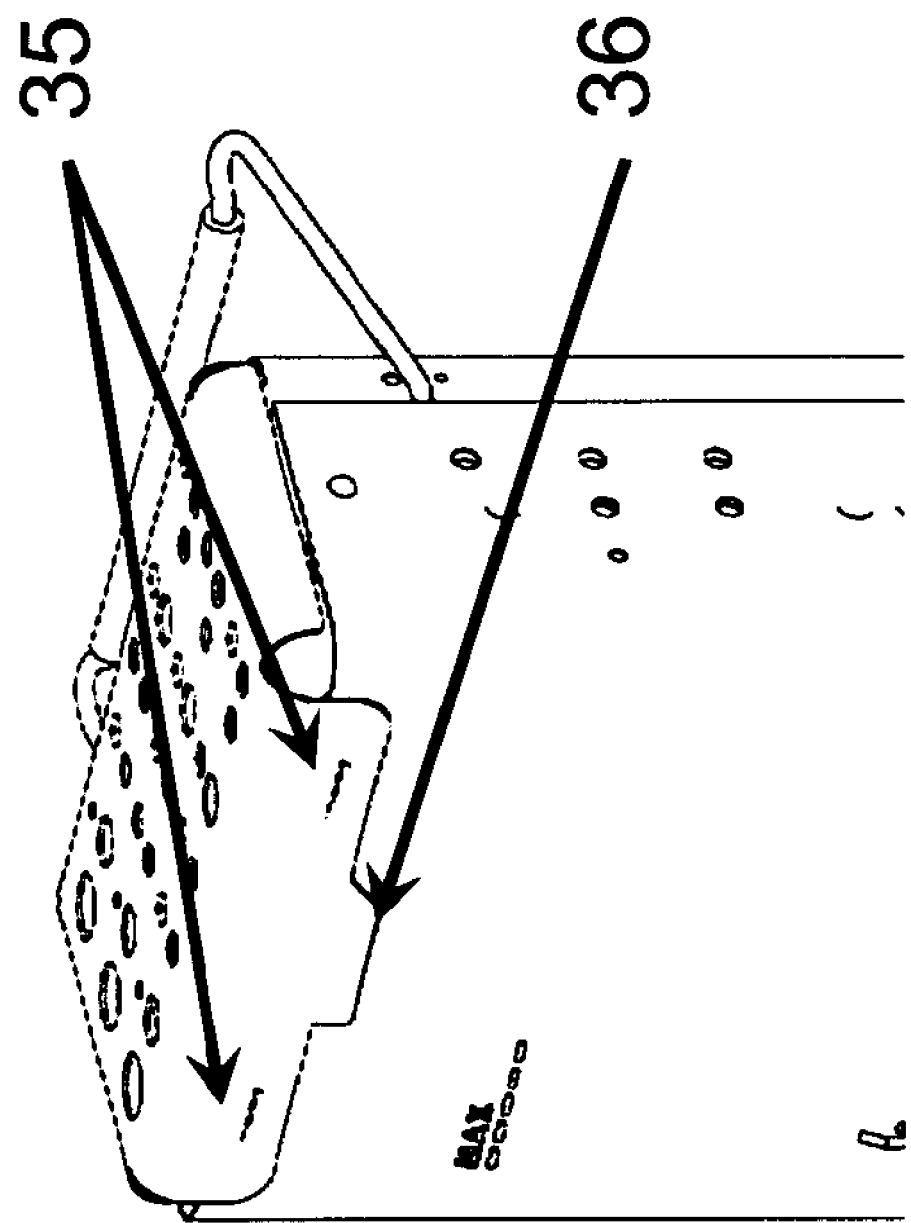
FIG. 6D: shows a perspective view of two vented safety covers, in accordance with some embodiments of the present invention.

FIGS. 6C and 6D illustrate alternative embodiments of the present invention, wherein the securing mechanism may be equipped with a lip (36), which further ensures that the safety cover (22) closes over the exterior surface of the outer cover (12).

Figure 2:
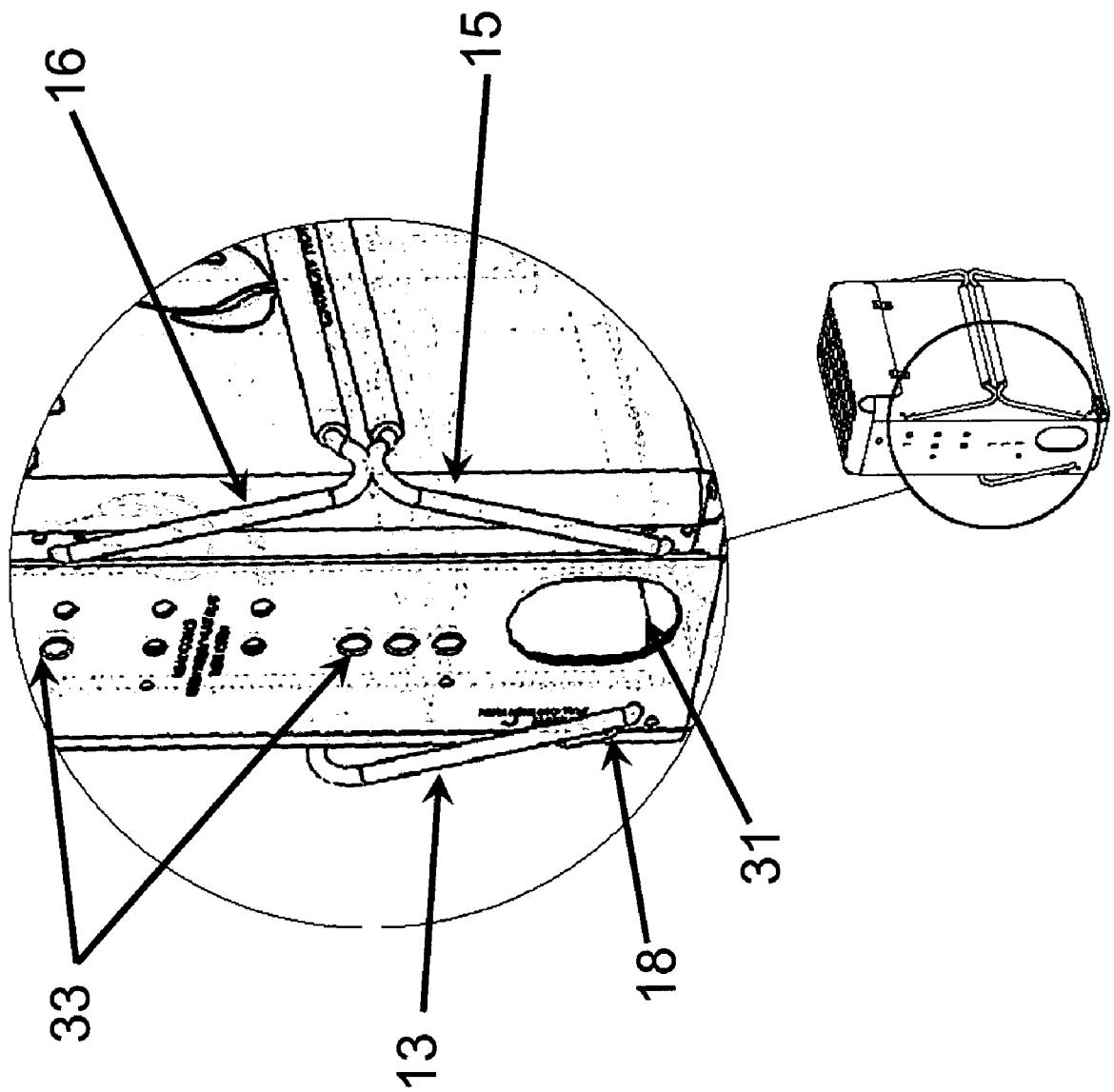
FIG. 2: shows a detailed perspective view of the side of the portable grill, in accordance with some embodiments of the present invention.

The plurality of small perforations along each of the sides of the portable grill may (10) create convection vents (33) that provide aeration for the flames, further enabling the rapid heating of the charcoal (29). This detail can be seen in FIG. 2.

The igniting area (17) may be located within the housing, beneath the charcoal (29). The igniting area (17) may be adapted to receive ignited paper and other kindling material for heating up the charcoal (29). This detail is described in FIG. 5.

Large openings (31), designed for inserting feeder material, may be located on each side of the portable grill (10) and may provide access to the igniting area (17). These large openings are most clearly shown in FIGS. 3 and 5. The large openings (31) may be large enough that a wad of crumpled paper or other natural, combustible material can be easily fed through them into the igniting area (17). This way, a user can continue to feed the fire if the paper burns out, without disrupting either the charcoal (29) or the vertical configuration of the portable grill (10). The large openings (31) are centrally situated on the lower sides of the portable grill (10) rather than along an edge, in order to provide additional structural strength. The large opening (31) may overlap the inner and outer covers (12, 14).

Figure 3:
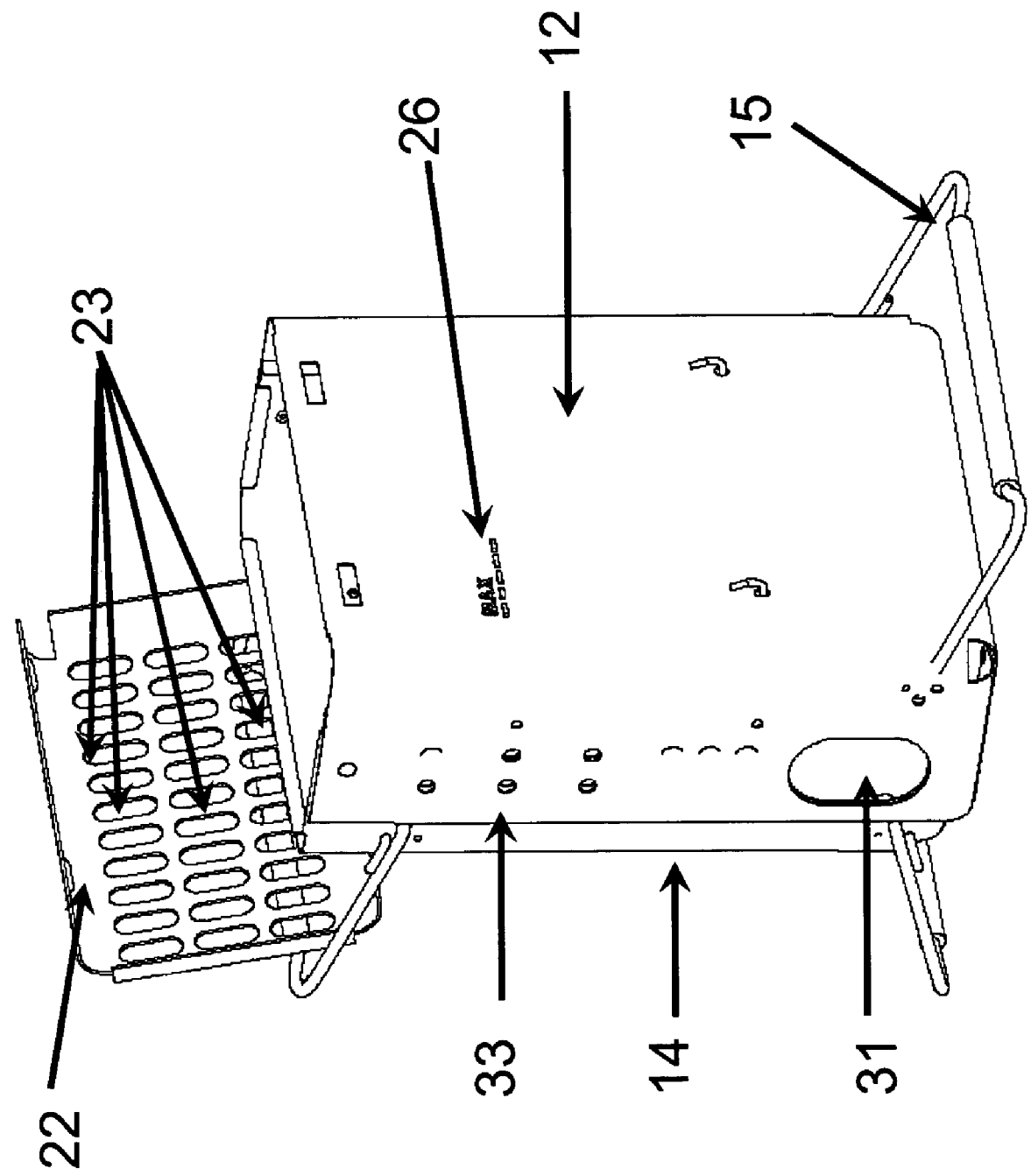
FIG. 3: is a perspective view of the grill positioned to receive charcoal, with the vented safety cover open and all of the legs in locked open position, in accordance with some embodiments of the present invention.

In accordance with some embodiments, there may be a fill mark (26), shown in FIG. 3, which may indicate, for example, the maximum amount of charcoal (29) that should be placed in the portable grill (10) when in the closed position. Once the portable grill (10) is in the fully opened position, the user can add more charcoal (29) as required.

Figure 5:
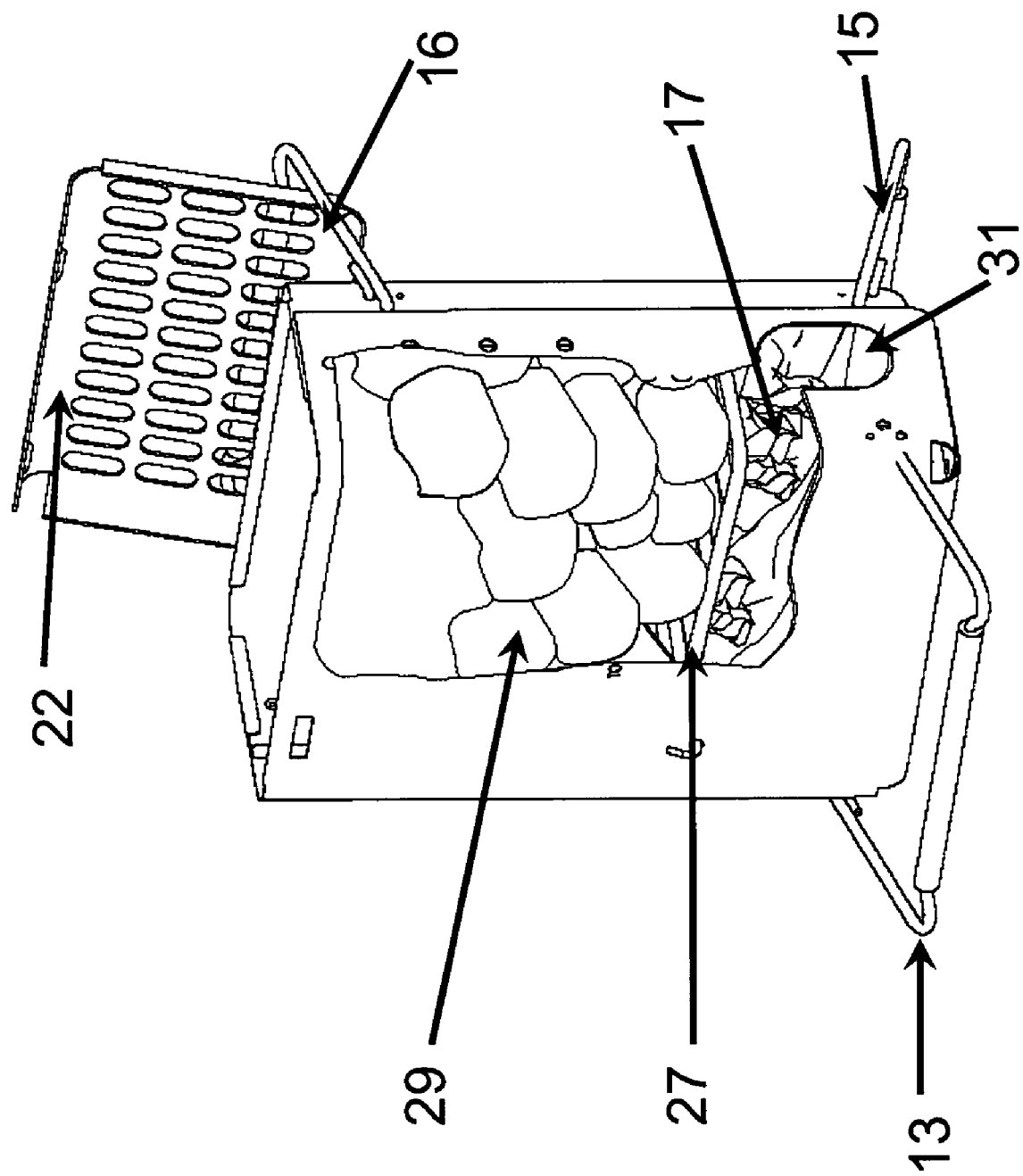
FIG. 5: is a sectional view of the grill filled with charcoal, in accordance with some embodiments of the present invention.

A collapsible shelf (27) situated inside the portable grill (10) may provide support for the charcoal (29) and may create a partitioned area that separates the igniting area (17) from the charcoal (29) during ignition, as shown in FIG. 5. As a result, additional ignition material may be easily introduced into the large openings for inserting feeder material (31) without removing or rearranging the charcoal (29).

Figure 7:
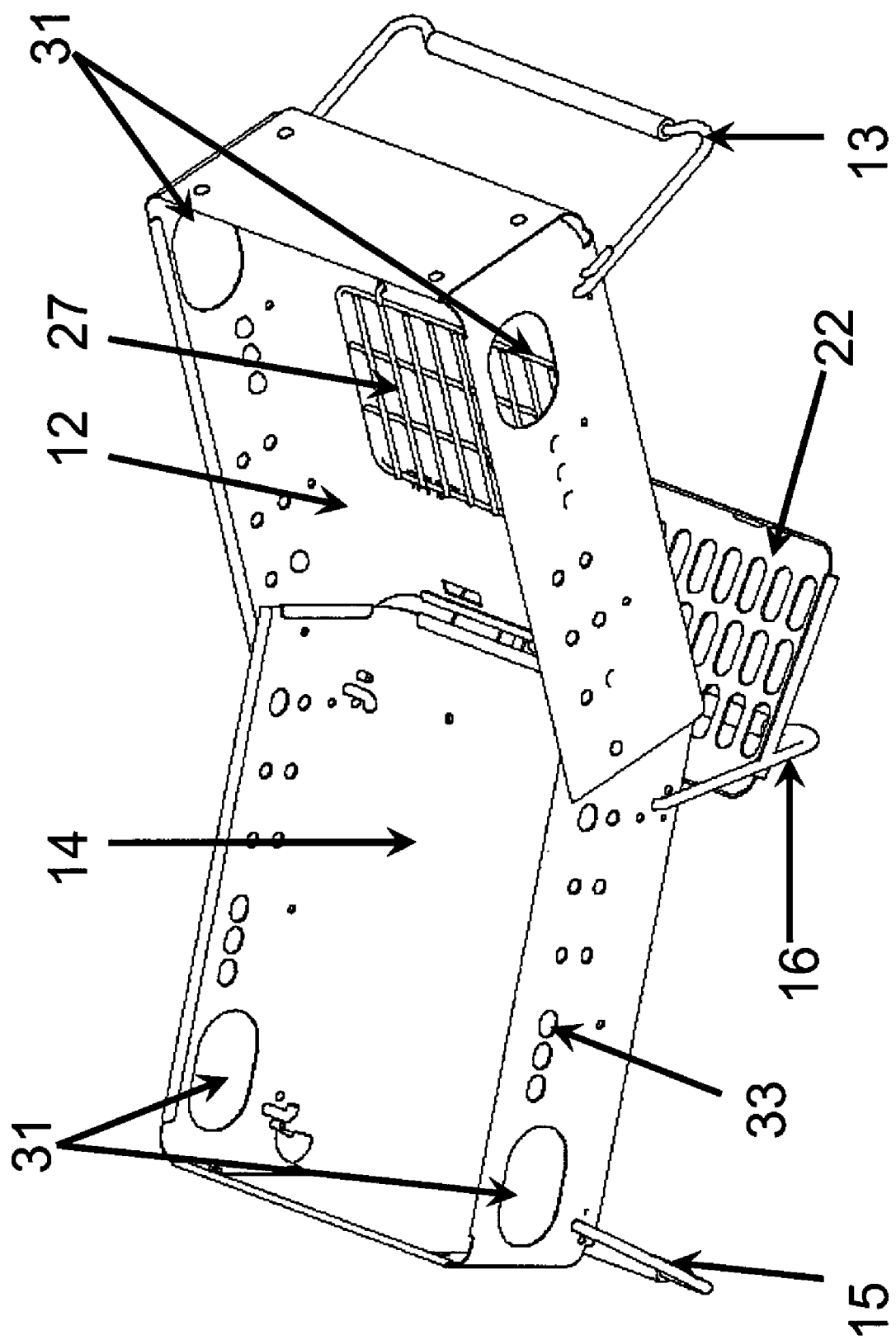
FIG. 7: shows a perspective view of the grill in a partially opened position, with the shelf, in accordance with some embodiments of the present invention.

Another feature of the collapsible shelf (27) is that it may automatically rotate from a position that is substantially perpendicular to the outer cover (12) to a position that is substantially parallel and adjacent to the outer cover (12) when the portable grill (10) is opened, so that it remains out of the way, when the charcoal (29) is moved into the full grilling area (37). This feature is seen in FIG. 7.

The portable grill (10) may be equipped with three legs: an outer cover leg (13), an inner cover leg (15), and a center leg (16). The locations and positions of each leg (13, 15, 16) are clearly shown in FIGS. 1 and 3. These legs (13, 15, 16) may also serve as handles for carrying the grill.

When the portable grill (10) is in the vertical, closed position (see FIG. 5), the outer cover leg (13) and the inner cover leg (15) can be extended to provide added stability when the portable grill (10) sits on the ground.

Testing has shown that while hot to the touch, the legs' surface temperature does not provide a burn hazard. This is because the legs (13, 15, 16) are not materially part of the body and thus do not conduct the heat from the body. There is the option of encasing one or all of the legs (13, 15, 16) with rubber (32) or other heat resistant material for physiological or psychological comfort.

Figure 4A:
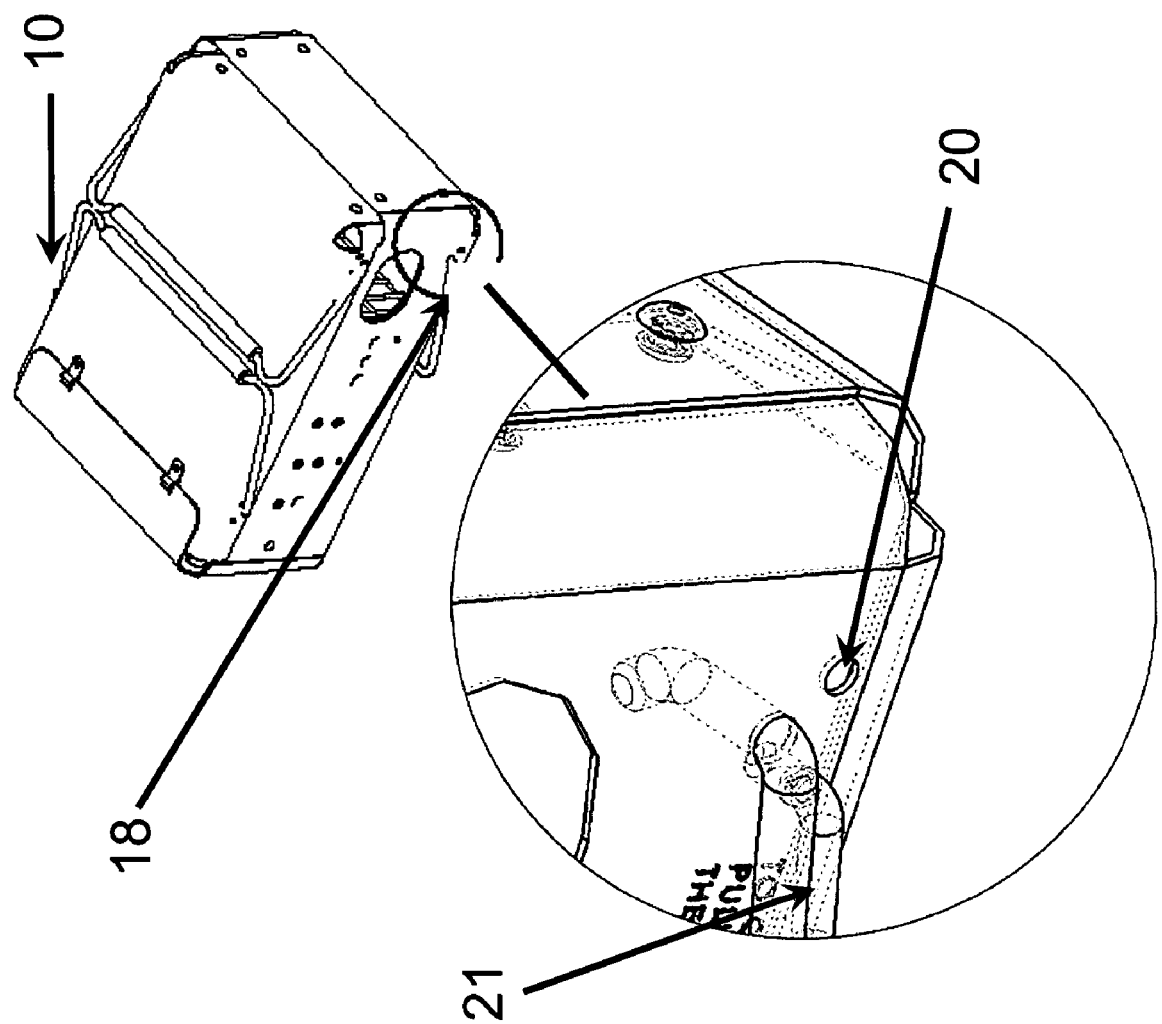
FIG. 4A: shows detailed views of a leg joint in the flexibly closed position, in accordance with some embodiments of the present invention.
Figure 4B:
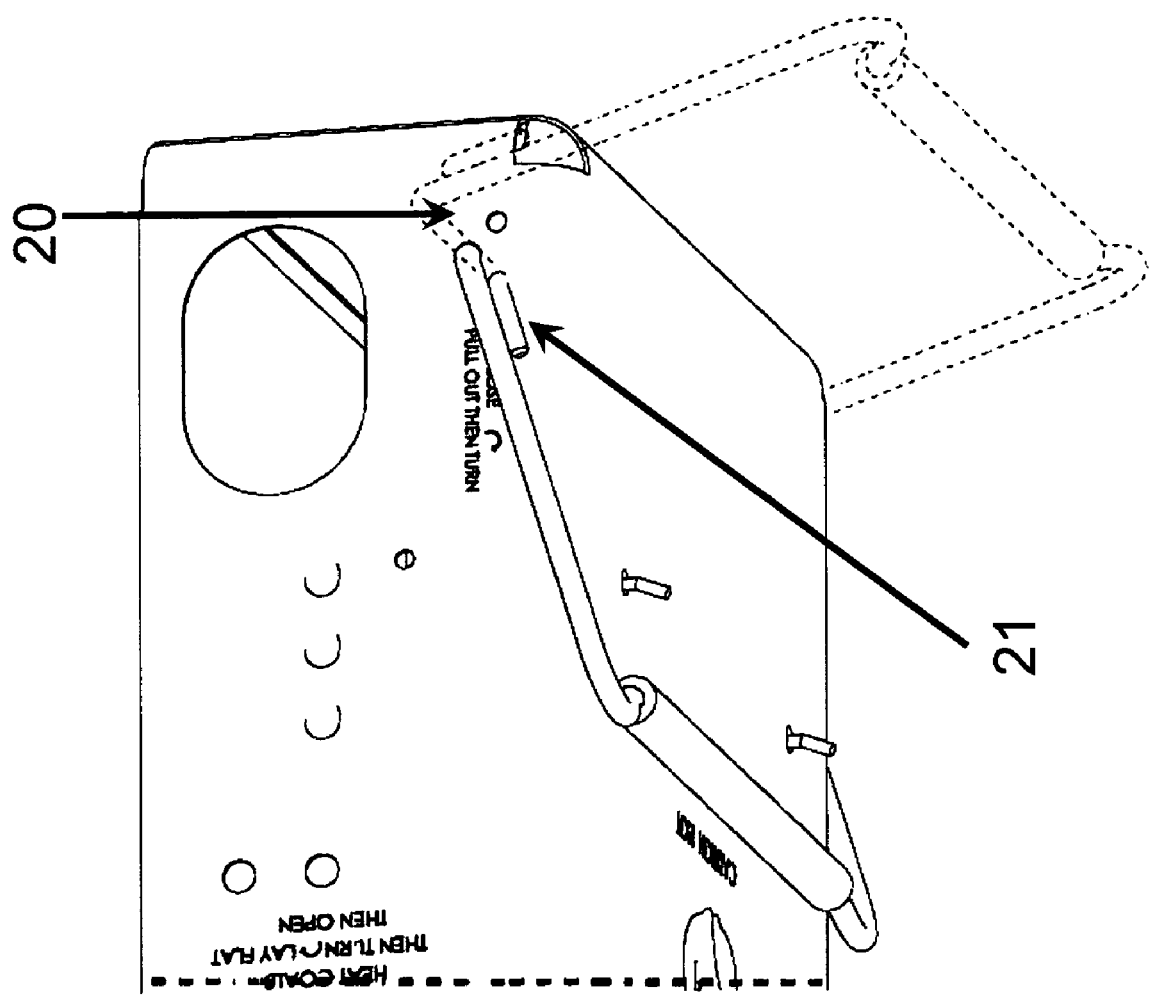
FIG. 4B: shows detailed views of a leg joint in the flexibly closed position, in accordance with some embodiments of the present invention.
Figure 4C:
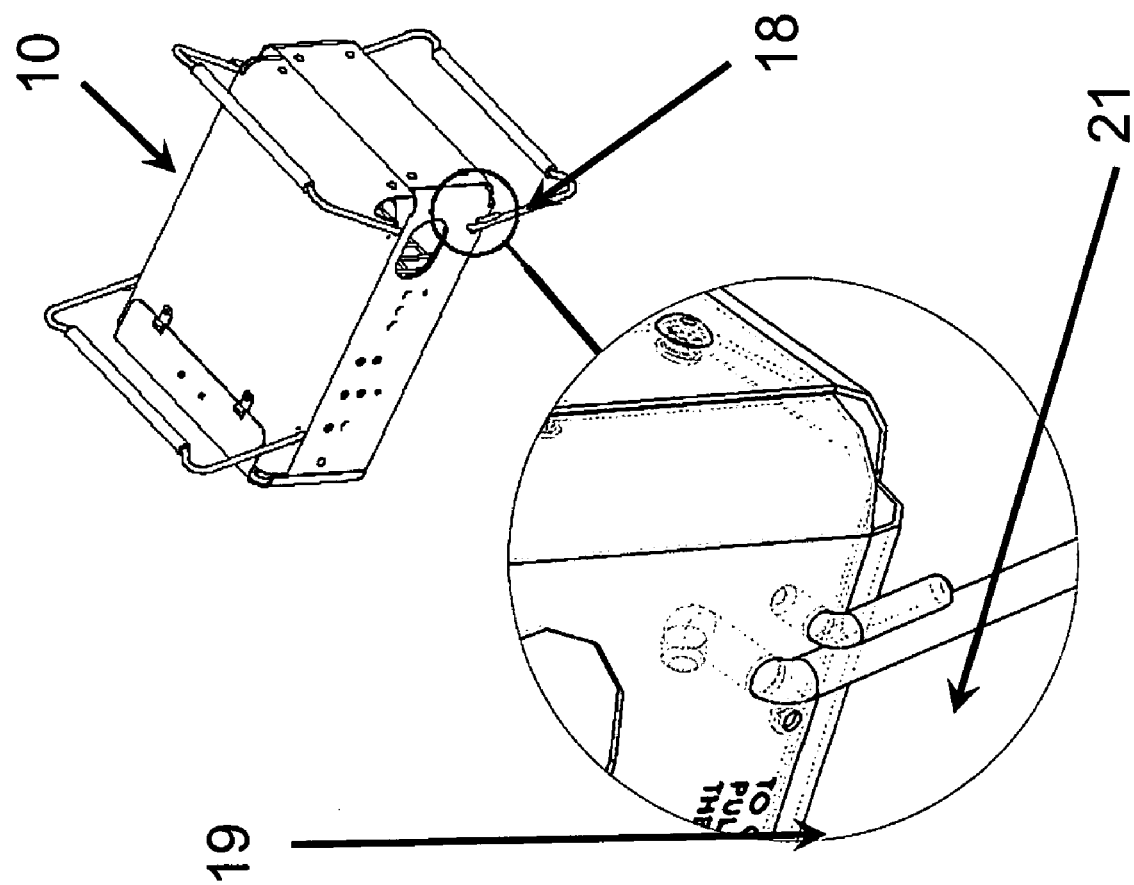
FIG. 4C: shows detailed views of a leg joint in the locked open position, in accordance with some embodiments of the present invention.
Figure 4D:
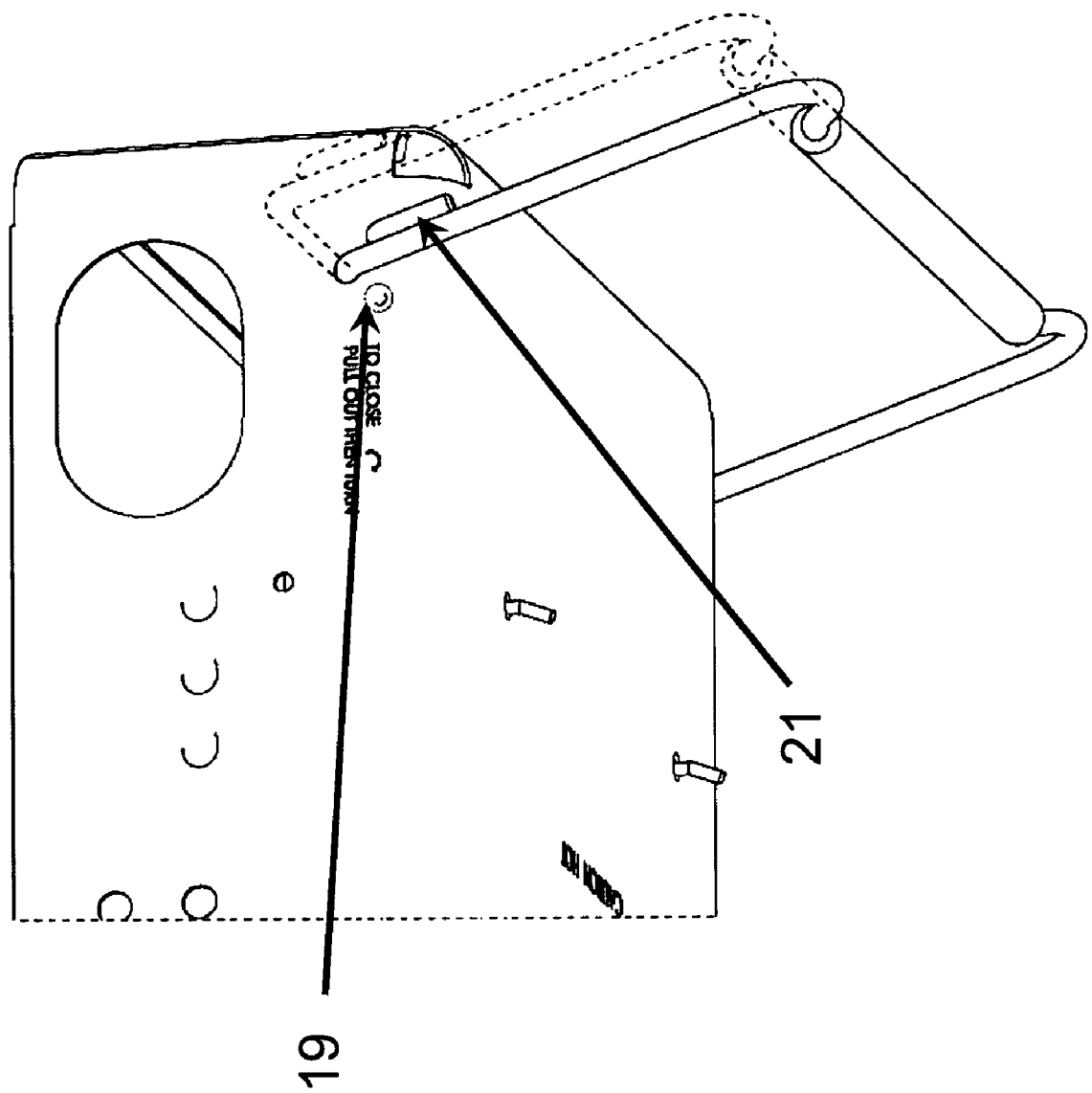
FIG. 4D: shows detailed views of a leg joint in the locked open position, in accordance with some embodiments of the present invention.

One of the novel features of some embodiments of the present invention is the joint (18) described in FIGS. 4A, 4B, 4C and 4D, which has a flexibly closed position and locked open position. FIGS. 4A and 4B shows the flexibly closed position; FIGS. 4C and 4D shows the locked open position. Each leg (13, 15, 16) may be equipped with at least one joint (18). This unique joint (18), of a sheet- and rod-metal design, for example, occurs at the point where the leg (13, 15, 16) connects to the housing of the portable grill (10). The design utilizes the inherent elasticity of the metal rod (21) to create a joint (18) with two or more distinct positions. In the flexibly closed position, the leg (13, 15, 16) is folded against the housing of the portable grill and the rod (21) is seated in a debossment area (19), as seen in FIGS. 4A, 4B, 4C and 4D. When the leg (13, 15, 16) is rotated to the fully extended position, the joint (18) may easily move to the locked open position due to the inherent springiness of the rod (21) that may cause the rod (21) to seat securely into a drilled out area (20), as seen in FIGS. 4A, 4B, 4C and 4D.

Figure 8A:
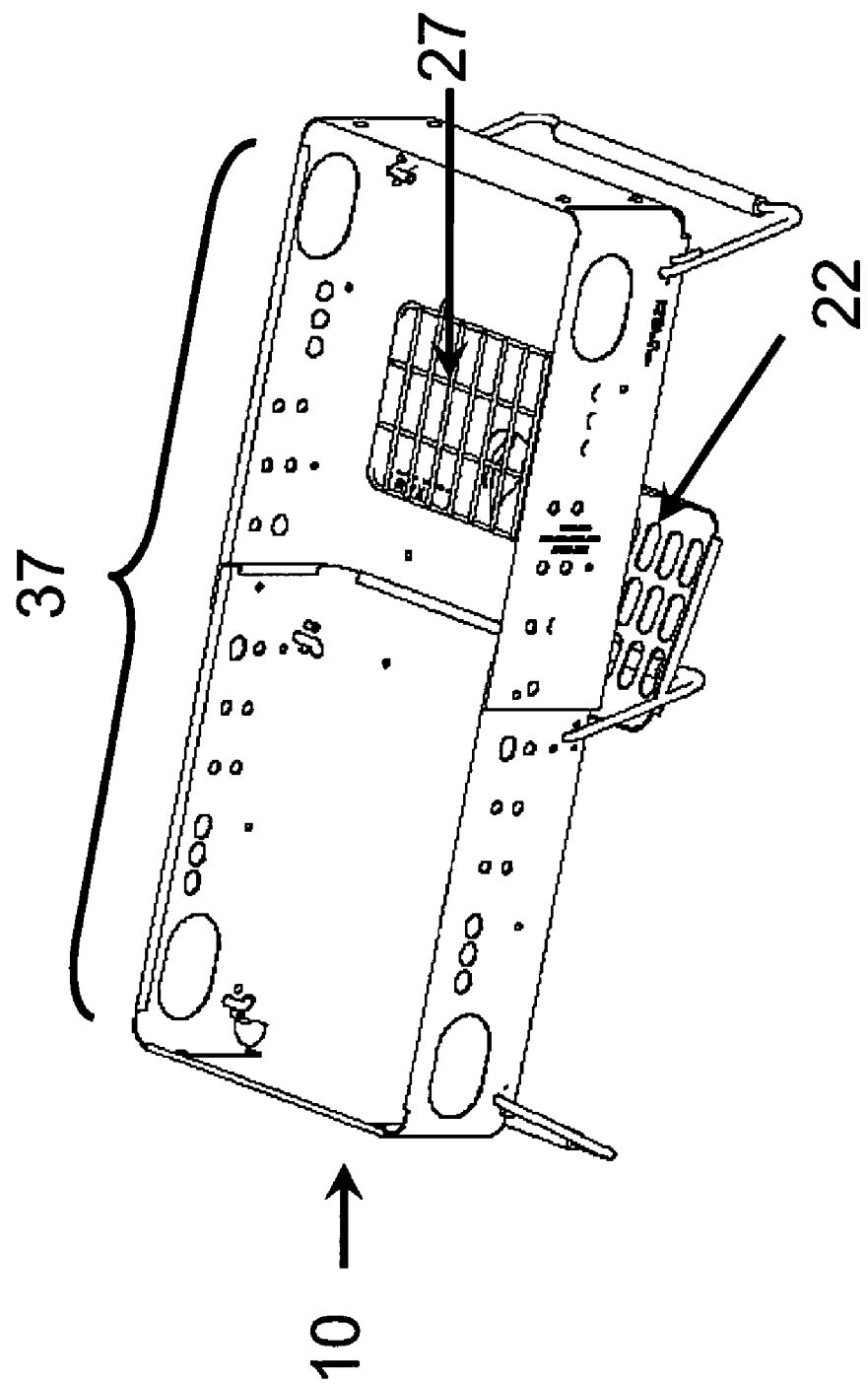
FIG. 8A: shows a perspective view of the grill in the fully open position, in accordance with some embodiments of the present invention.
Figure 8B:
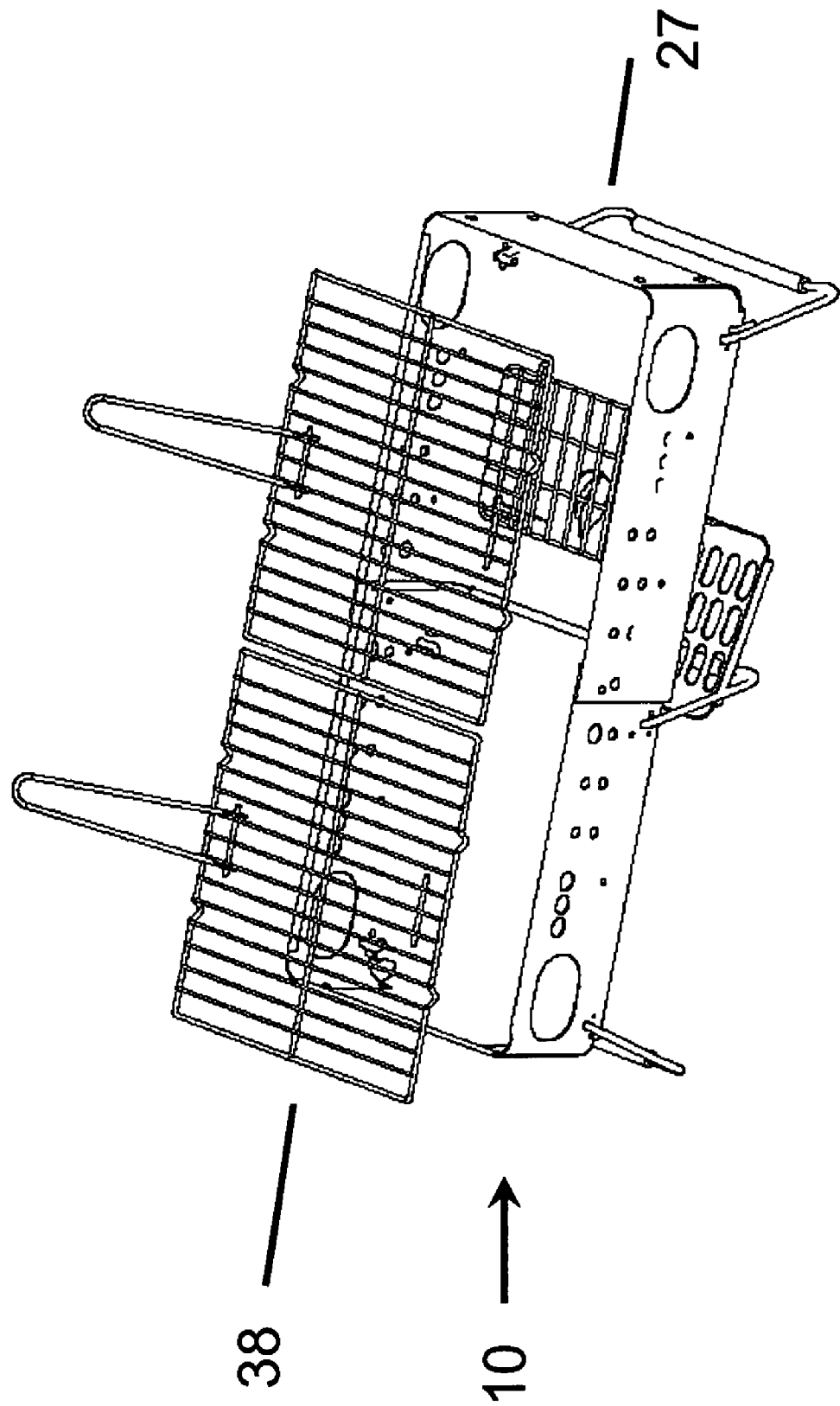
FIG. 8B: shows the same view, with the cooking grid in place, in accordance with some embodiments of the present invention.

Once opened, the entire space of the portable grill (10) can be used for cooking; each half of the portable grill (10) can support a flat, wire cooking grid (38), described in FIGS. 8A and B. Opening the portable grill (10) creates a grilling area (37) that is twice the surface area of one of its sides and approximately five times the size of the chimney lid.

In the preferred embodiment, the portable grill (10) is made of durable metal and can be reused repeatedly. There is also the option of using any other heatproof and sturdy material that will stand up to repeated use.

In order to understand further the present invention, the operation of the portable grill (10) is described in detail below and also described briefly in FIG. 9.

Operations

The portable grill (10) may be transported from one location to another while in the fully closed position, wherein the outer cover leg (13), the inner cover leg (15), and center leg (16) may be in the flexibly closed position, as seen in FIG. 1. The user may also carry the closed portable grill by opening one of the legs (13, 15, or 16) and gripping said leg as a handle. Once at the desired location, the user must prepare the portable grill (10) for cooking, which may requires the following (refer to FIG. 3). The lower end of the portable grill (10) may be placed on a level, heat resistant surface. The center leg (16) may be rotated up to the open, locked position and the outer cover leg (13) and inner cover leg (15) may be rotated down to the open, locked position. The securing mechanism may be released and the safety cover (22) may be rotated up. Charcoal (29) may be placed in the portable grill (10), on the collapsible shelf (27), filling the portable grill (10), for example, to the maximum fill mark (26). The portable grill (10) filled with charcoal (29) is shown in FIG. 5. The safety cover (22) may then be rotated back to the closed position and secured.

Wadded paper or any other kindling material may be inserted through the large opening (31) into the igniting area (17), and ignited. FIG. 5 shows the portable grill (10) filled with kindling material, ready for ignition. The ignited kindling material will heat up the charcoal (29) to a temperature suitable for cooking. There is no need to add lighter fluid or other accelerants. Convection vents (33) on both sides of the portable grill (10), shown most clearly in FIG. 2, and openings (23) in the closed safety cover (22), seen in FIGS. 1 and 3, may allow air to circulate through the charcoal (29), speeding up the heating process. If the kindling material burns out before the charcoal (29) is suitably heated, additional kindling material can be introduced through the large opening (31) into the ignition area (17) and ignited, with no need to move, or rearrange in any way, the charcoal (29).

Figure 9A:
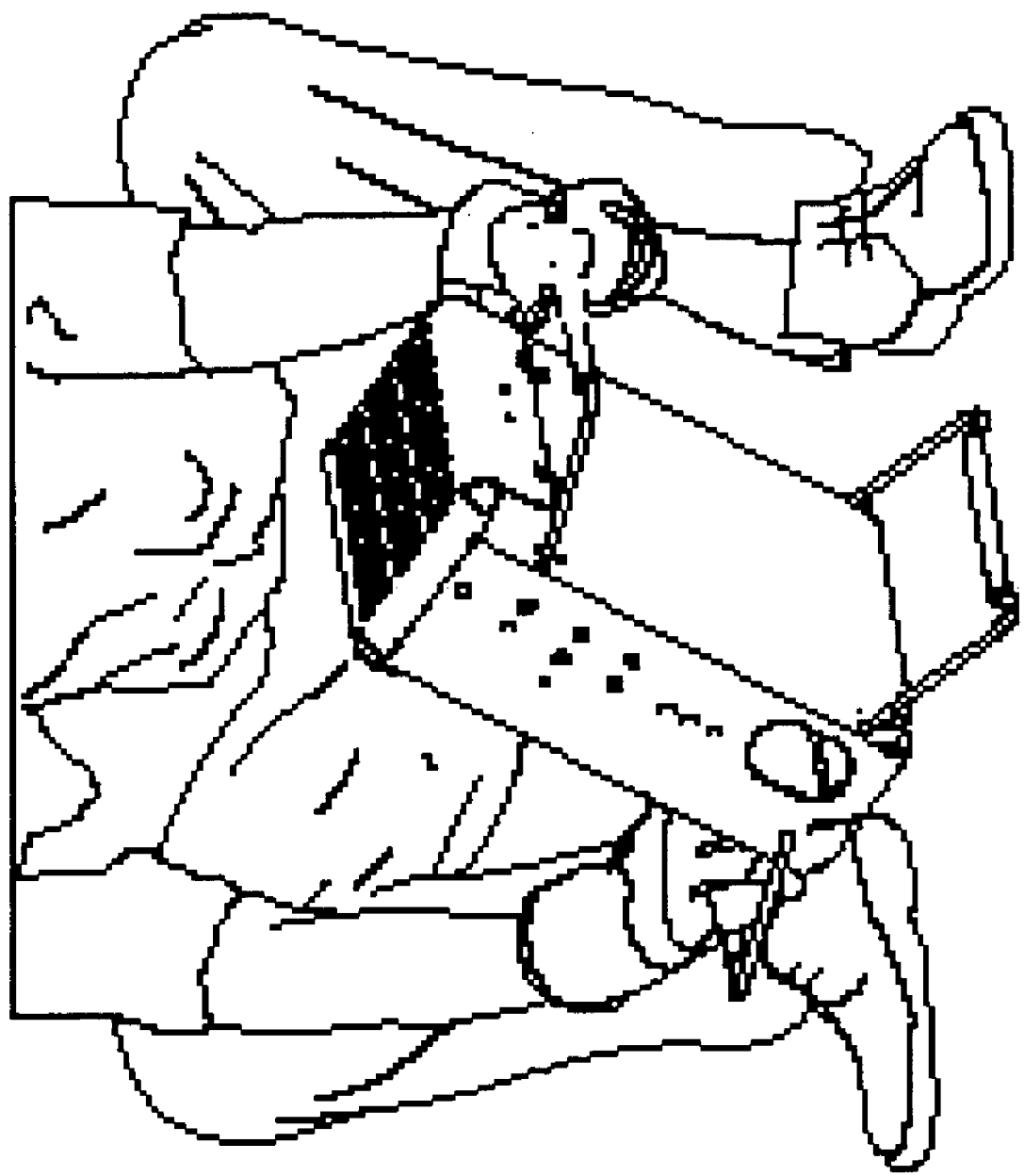
FIGS. 9A to F: describe the process for operating the portable charcoal grill, in accordance with some embodiments of the present invention.
Figure 9B:
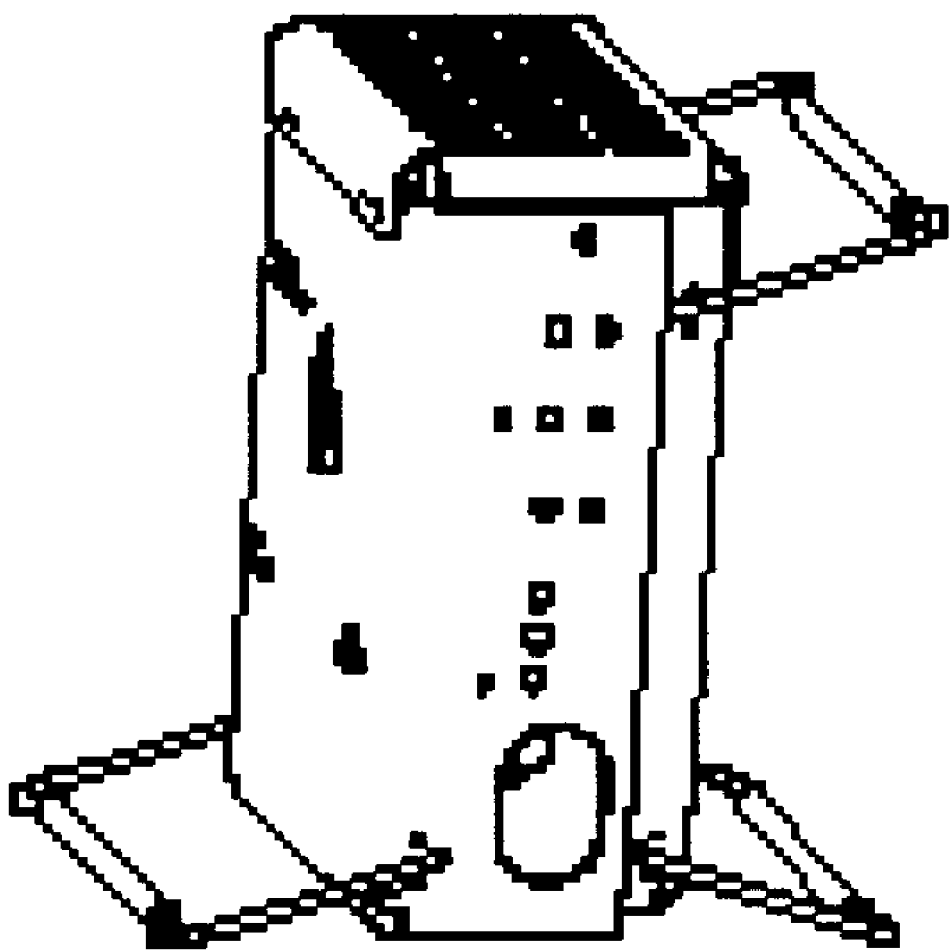
Figure 9C:
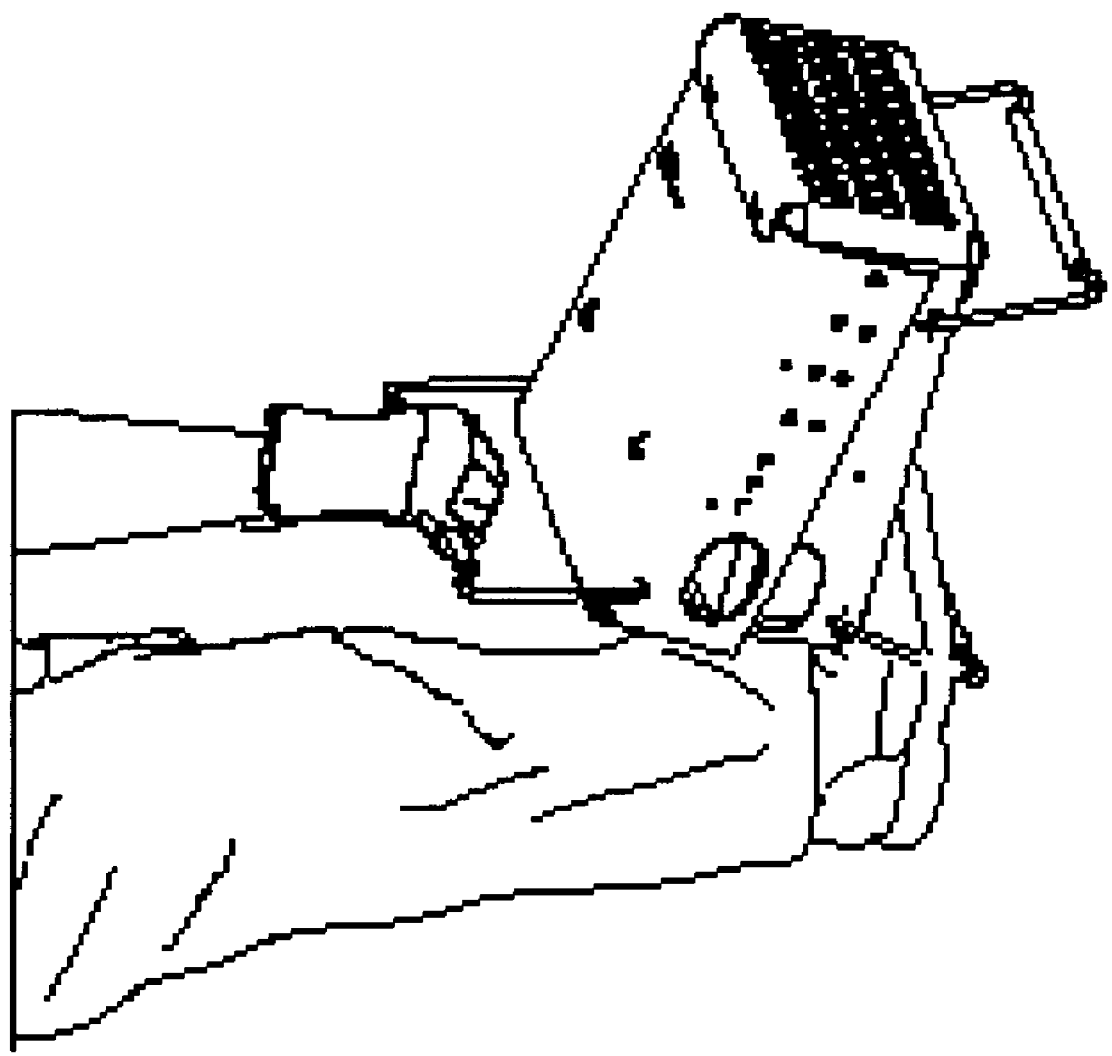
Figure 9D:
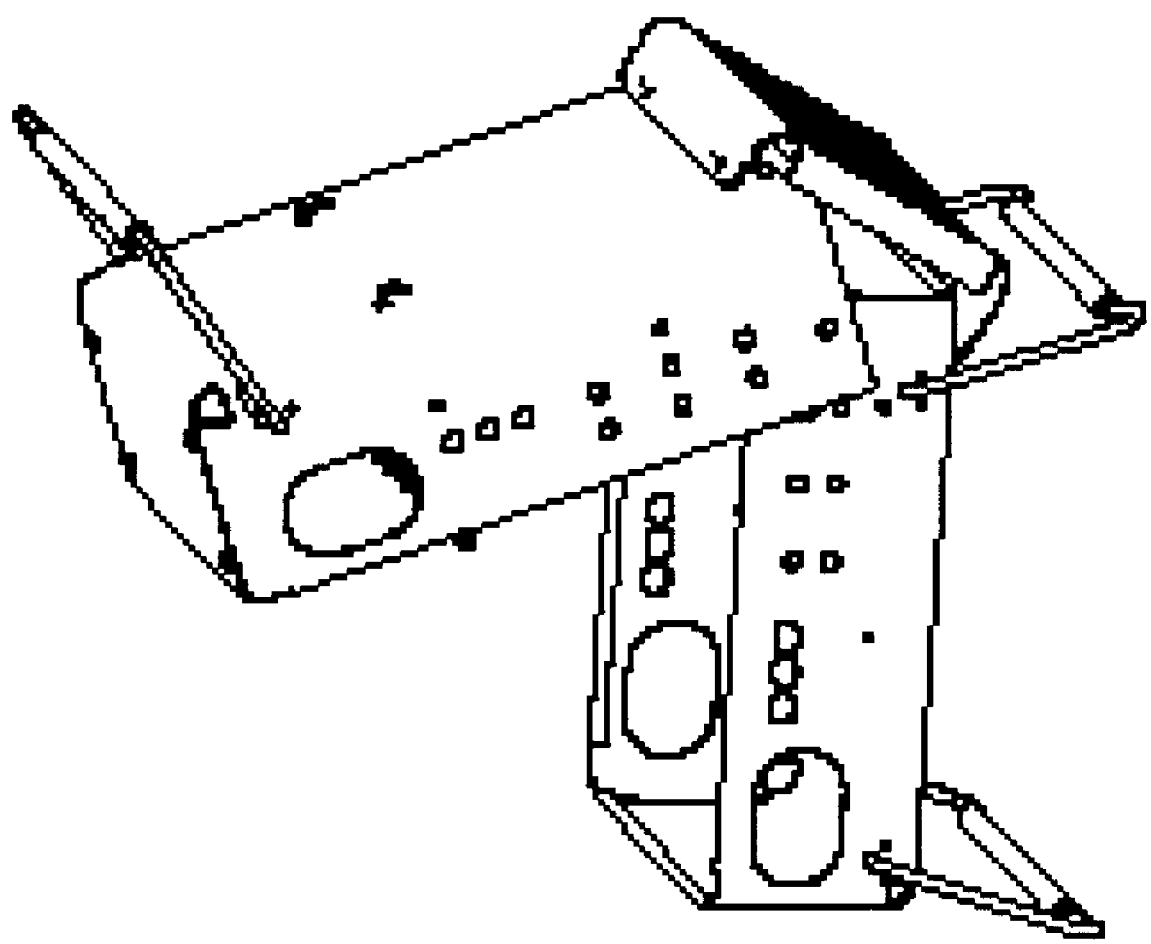
Figure 9E:
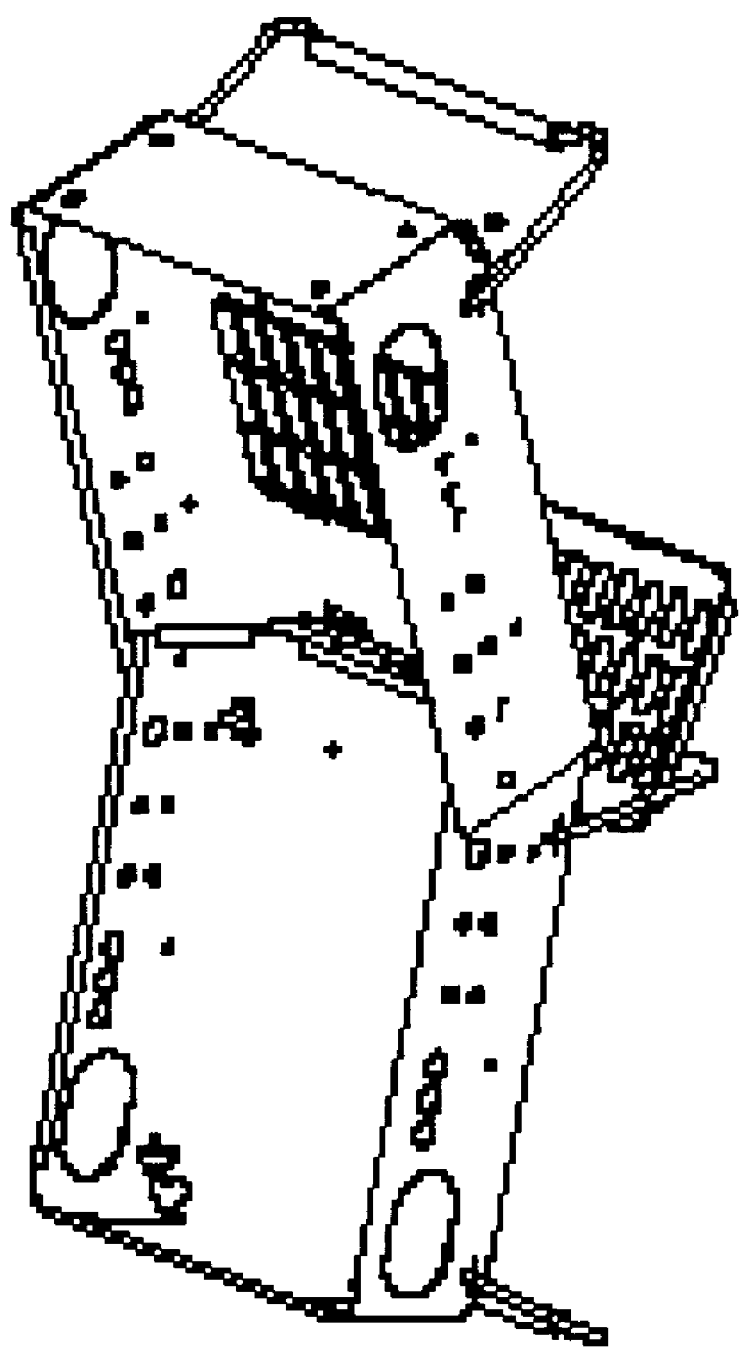
Figure 9F:
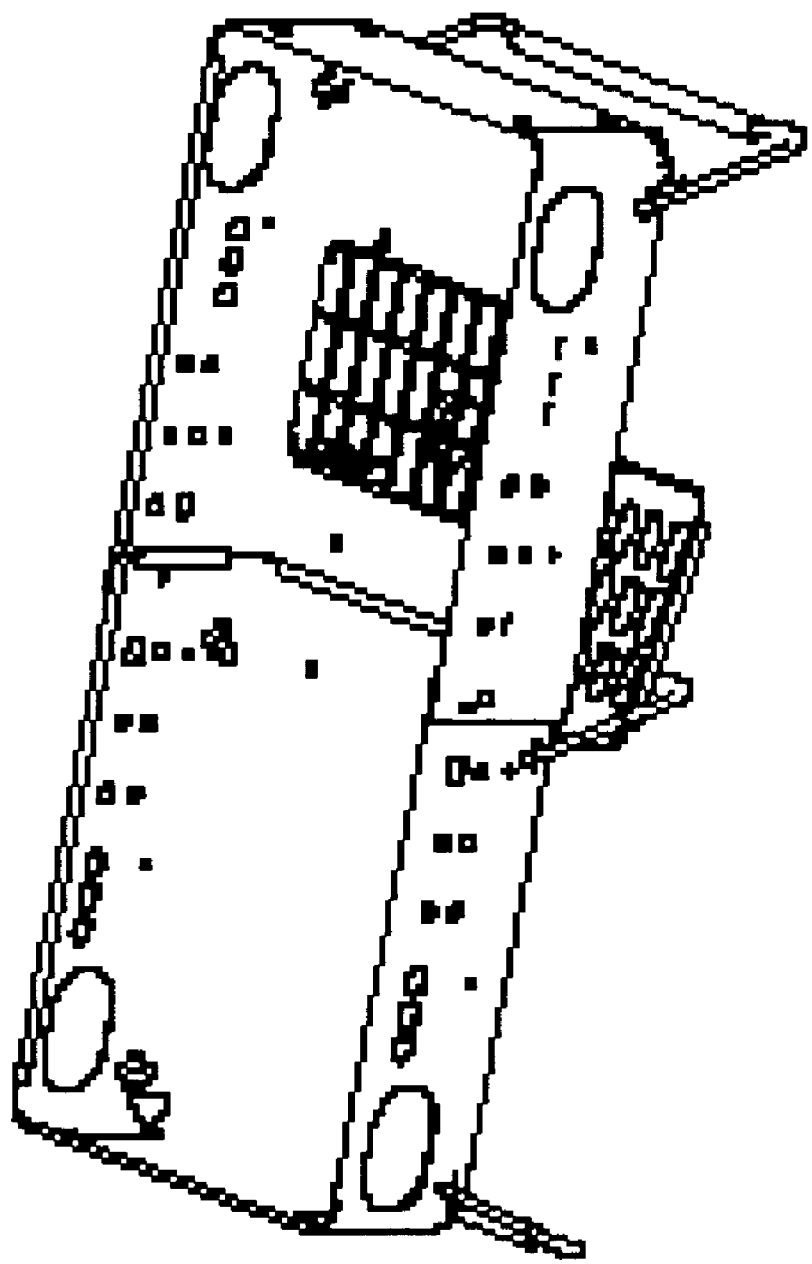

Once the charcoal (29) has reached cooking temperature, the portable grill (10) may be rotated and opened. These actions are also described in FIG. 9. The safety cover (22) may remain in the locked position until the portable grill (10) is fully rotated to prevent hot charcoal (29) from spilling out. The user may grasp the center leg (16) with one hand and the outer cover leg (13) with the other and rotate the portable grill (10) over to its long side so that the center leg (16) sits on the ground, for example, as shown in FIGS. 9A and 9B. The user may secure the portable grill (10) in place, ideally with his foot on the inner cover leg (15), and may lift the outer cover leg (13) to open the portable grill (10) (see FIG. 9C). As the outer cover rotates up and out, the securing mechanism on the safety cover (22) may be released automatically and the safety cover (22) drops down, catching any charcoal the may leak out. At the same time, the shelf (27) may fall back to a flattened position. The repositioned shelf (27) is shown in FIGS. 7, 9D, and 9E.

Once the portable grill (10) has been fully rotated over to its side, and the outer cover leg (13) is fully seated on the surface, the charcoal (29) should be spread out over the entire grilling area (37). At this stage, additional charcoal (29) can be added, if necessary. The cooking grids (38) may be set in place and the portable grill (10) may be ready for use seen in FIGS. 8A, 8B, and 9F.

The exterior surfaces of the outer cover (12) and a safety cover (22) of the portable grill (10) can also be used as a warming tray when in either the closed vertical or horizontal positions.

After use, and once the charcoal (29) is sufficiently cooled, the portable grill (10) may be prepared for transport or storage as follows: The charcoal (29) may be removed. The legs (13, 15, 16) may be released from the locked open position by pulling the rods (21) out and away from body and then rotating the legs (13, 15, 16) back to the flexibly closed position. The outer and inner covers (12, 14) may be rotated back together and the safety cover (22) may be secured.

While the above description contains many specificities, these should not be construed as limitations on the scope of the invention, but rather as exemplifications of the preferred embodiments. Those skilled in the art will envision other possible variations that are within the scope of this invention. Accordingly, the scope of the invention should be determined not by the embodiment illustrated, but by the appended claims and their legal equivalents.

What is claimed is:

1. A portable grill device having a closed position and an open position, said grill comprised of:
   a housing, with a plurality of convection openings on at least one surface of said housing, said housing including an outer cover and an inner cover hinged together at one end,
   wherein in the closed position, the lower end and the lateral sides of the outer cover overlap and cover the corresponding end and sides of the inner cover;
   a collapsible shelf having a substantially horizontal position and a substantially parallel and adjacent position, wherein said shelf is situated inside the grill housing,
   wherein in the closed position, the substantially horizontal position of said shelf supports the charcoal and creates a temporary partition to provide a separate ignition area below the charcoal during an ignition process,
   in the open position, the substantially parallel and adjacent position of said shelf to the outer cover eliminates the ignition area; and
   said shelf automatically rotates between said substantially horizontal, supporting position and a collapsed, prone position when said grill device moves between the closed and open positions, and a safety cover having a plurality of convection openings dispersed across the surface of said cover for providing aeration for the flames, wherein in the closed upright position, the interior cavity of the housing creates a single charcoal containment area and the organized placement of the openings on the housing and safety cover manipulates air flow and circulation to enable convection heat transfer throughout said single charcoal containment area causing the charcoal to heat more quickly and efficiently, and in the fully-opened position the outer and inner covers create an enlarged contiguous grilling area;

wherein the safety cover is attached to the hinged end of the inner cover.

2. A portable grill device having a closed position and an open position, said grill comprised of:

a housing, with a plurality of convection openings on at least one surface of said housing, said housing including an outer cover and an inner cover hinged together at one end, wherein in the closed positions, the lower end and the lateral sides of the outer cover overlap and cover the corresponding end and sides of the inner cover;

a collapsible shelf having a substantially horizontal position and a substantially parallel and adjacent position, wherein said shelf is situated inside the grill housing, wherein in the closed position, the substantially horizontal position of said shelf supports the charcoal and creates a temporary partition to provide a separate ignition area below the charcoal during an ignition process, in the open position, the substantially parallel and adjacent position of said shelf to the outer cover eliminates the ignition area; and said shelf automatically rotates between said substantially horizontal, supporting position and a collapsed, prone position when said grill device moves between the closed and open positions, and a safety cover having a plurality of convection openings dispersed across the surface of said cover for providing aeration for the flames, wherein in the closed upright position, the interior cavity of the housing creates a single charcoal containment area and the organized placement of the opening on the housing and safety cover manipulates air flow and circulation to enable convection heat transfer throughout said single charcoal containment area causing the charcoal to heat more quickly and efficiently, and in the fully-opened position the outer and inner covers create an enlarged contiguous grilling area;

wherein the safety cover includes a securing mechanism adapted to maintain the safety cover in a locked position while the device is in the closed position, and automatically releasing said safety cover when sufficient pressure is applied by the increasingly obtuse angle of said outer and the inner covers when the device is moved to the open position.

3. The device of claim 2, wherein the securing mechanism is of a louver and lock type.

4. The device of claim 1, wherein the plurality of convection openings on the housing includes a plurality of small perforations along the housing sides creating convection vents.

5. The device of claim 1, wherein the plurality of convection openings on the housing includes two large openings, one at each side of the housing, situated on lower part of the device, said openings additionally providing access to the ignition area of the device when in the closed position.

6. The device of claim 1, wherein the housing includes a fill mark for indicating the maximum amount of charcoal to be placed in the device when in the closed position.

7. The device of claim 1, further comprising two legs attached to the inner cover, each leg situated at one edge of inner cover, and a third leg attached to the far edge of the outer cover.

8. The device of claim 7, wherein in the closed vertical position, the device sits on the ground and two of the legs support the device for increased stability.

9. The device of claim 7, wherein in the closed horizontal position, the device sits on two of the legs and the third leg functions as a handle for opening or carrying the device.

10. The device of claim 7, wherein in the open horizontal position, the device sits on all three legs.

11. The device of claim 7, wherein the legs are immaterially connected to the housing.

12. The device of claim 7, wherein the legs are attached to the housing using a joint connector, wherein the elasticity of said rod enables said legs to be in a locked position or in free rotation around their axis.

13. The device of claim 7 wherein a joint rod can be stretched to move between at least two positions, including a locked position in which the rod is seated into a drilled-out area of the housing and a free position wherein the rod is seated in a debossment area of the housing.

* * * * *